United States Patent
Okada et al.

(10) Patent No.: US 8,041,128 B2
(45) Date of Patent: Oct. 18, 2011

(54) IMAGE PROCESSING APPARATUS AND METHOD FOR PROCESSING IMAGE HAVING HIERARCHICAL STRUCTURE

(75) Inventors: Shigeyuki Okada, Ogaki (JP); Yoshihiro Matsuo, Hashima (JP); Shinichiro Okada, Toyohashi (JP)

(73) Assignee: Sanyo Electric Co., Ltd., Osaka (JP)

( * ) Notice: Subject to any disclaimer, the term of this patent is extended or adjusted under 35 U.S.C. 154(b) by 1137 days.

(21) Appl. No.: 11/090,012

(22) Filed: Mar. 28, 2005

(65) Prior Publication Data

US 2005/0220323 A1 Oct. 6, 2005

(30) Foreign Application Priority Data

Mar. 30, 2004 (JP) ................... 2004-101521
Mar. 4, 2005 (JP) ................... 2005-061296

(51) Int. Cl.
*G06K 9/00* (2006.01)
(52) U.S. Cl. .............................. 382/232; 382/100
(58) Field of Classification Search .............. 713/176
See application file for complete search history.

(56) References Cited

U.S. PATENT DOCUMENTS

| | | | | |
|---|---|---|---|---|
| 7,356,148 B2* | 4/2008 | Hayashi | ............... | 380/281 |
| 7,362,860 B2* | 4/2008 | Hayashi | ............... | 380/210 |
| 2003/0154378 A1* | 8/2003 | Hirano | ............... | 713/176 |
| 2005/0244070 A1 | 11/2005 | Itakura | | |

FOREIGN PATENT DOCUMENTS

| | | |
|---|---|---|
| JP | 2001-086444 | 3/2001 |
| JP | 2004-088425 | 3/2004 |
| WO | WO 03/071801 A1 | 8/2003 |

OTHER PUBLICATIONS

Chinese Office Action, with English translation, issued in Chinese Patent Application No. 200510062783.7 dated on May 9, 2008.
Chinese Office Action issued in corresponding Chinese Patent Application No. CN 2005-10062783.7, dated Jul. 20, 2007.
Chinese Office Action, with English Translation, issued in Chinese Patent Application No CN 200510062783.7, Aug. 22, 2008.
Chinese Office Action, with English translation, issued in Chinese Patent Application No. 200510062783.7, dated May 22, 2008.
Chinese Office Action, w/ English translation thereof, issued in Chinese Patent Application No. CN 2007101994743 dated Sep. 4, 2008.
Japanese Office Action, with English translation, issued in Japanese Patent Application No. 2005-061296, mailed Apr. 27, 2010.

* cited by examiner

*Primary Examiner* — Claire X Wang
(74) *Attorney, Agent, or Firm* — McDermott Will & Emery LLP (57) ABSTRACT

The image processing apparatus comprises a wavelet transform unit, a frame buffer, a quantization unit, a bit plane coding unit, an arithmetic coding unit, and a stream generating unit, and converts an original image into coded image data hierarchically by using these units. A copyright level management table manages copyright levels to be permitted to users who use the coded image data. A copyright level recording unit records copyright level information on the corresponding profile into a header or other areas of the coded image data in consideration of such factors as users and regions to be provided.

9 Claims, 6 Drawing Sheets

22

| PROFILE A | | | | | |
|---|---|---|---|---|---|
| | REPRO-DUCTION | DUPLI-CATION | EDITING | REDISTRI-BUTION | GENERATION OF DUPLICATION |
| HIGH QUALITY | OK | NG | NG | NG | NG |
| MEDIUM QUALITY | OK | OK | NG | NG | 1 |
| LOW QUALITY | OK | OK | OK | NG | 2～3 |
| PROHIBITION | | | | O | 4 |

| PROFILE A | | | | | |
|---|---|---|---|---|---|
| | REPRO-DUCTION | DUPLI-CATION | EDITING | REDISTRI-BUTION | GENERATION OF DUPLICATION |
| HIGH QUALITY | OK | NG | NG | NG | NG |
| MEDIUM QUALITY | OK | OK | NG | NG | 1 |
| LOW QUALITY | OK | OK | OK | NG | 2～3 |
| PROHIBITION | | | | ○ | 4 |

IMAGE PROCESSING APPARATUS AND METHOD FOR PROCESSING IMAGE HAVING HIERARCHICAL STRUCTURE

BACKGROUND OF THE INVENTION

1. Field of the Invention

The present invention relates to an image processing apparatus. In particular, the invention relates to an image processing apparatus and a method for processing an image stream having a hierarchical structure.

2. Description of the Related Art

In recent years, the prevalence of infrastructures such as DVD media, digital broadcasting, and on-demand communications over networks has yielded widespread use of digital contents. Since digital contents causes no degradation in quality even after duplication, copyright management is of high importance. Demands for legitimate protection of copyrights on digital contents and other copyrighted materials are expected to grow in the future. Japanese Patent Laid-Open Publication No. 2001-86444 discloses a technique for prohibiting duplication by using copy control information included in a stream.

Nevertheless, techniques like this are no more than a uniform approach of either permitting or prohibiting, and it is impossible to satisfy various levels of demands both from contents providers and from users. For example, the contents providers might let business opportunities slip away if they simply prohibit duplication. Besides, the users have various orientations ranging from high-end to price-sensitive.

SUMMARY OF THE INVENTION

The present invention has been achieved in view of the foregoing. It is thus an object of the present invention to provide an image processing apparatus and a method by which contents providers can exercise flexible copyright management.

One of the aspects of the present invention is an image processing apparatus. This apparatus generates coded image data multiplexed in such manner that can be decoded into the images each having different image quality. The apparatus comprises an adding unit which adds a copyright level concerning use of the coded image data to the coded image data in advance so that the coded image data becomes readable with an image quality adjusted in accordance with the copyright level. This allows copyright management in accordance with image quality levels. Note that the "image quality" may include resolution. The "adding unit" may be a coding unit which records the copyright level in generating a stream of the coded image data, or a postprocessing unit which records it after the coding.

Another aspect of the present invention is an image processing apparatus. This apparatus generates coded image data multiplexed in such manner that can be decoded into the images each having different image quality. The apparatus comprises an adding unit which adds a copyright level concerning use of the images to at least one of the images. This allows copyright management depending on the individual image qualities. For example, it is possible to provide image qualities to be subjected to and not to be subjected to the copyright management.

Another aspect of the present invention is an image processing apparatus. This apparatus processes coded image data multiplexed in such manner that can be decoded into the images each having different image quality. The apparatus comprises: a management unit which manages a copyright level concerning use of the coded image data; and a processing unit which processes the coded image data with an image quality adjusted in accordance with the copyright level. This allows copyright management in accordance with image quality levels. The "management unit" may acquire the copyright level from a header of the coded image data, from communication, or from a copyright-managing card or the like when loaded.

Still another aspect of the present invention is an image processing apparatus. This apparatus processes coded image data multiplexed in such manner that can be decoded into the images each having different image quality. The apparatus comprises: a management unit which manages a copyright level determined concerning at least one of the images, the copyright level concerning use of the images; and a processing unit which performs processing in accordance with the copyright level. This allows copyright management depending on the individual image qualities. The "management unit" may acquire the copyright level from a header of the coded image data, from communication, or from a copyright-managing card or the like when loaded.

The copyright level may determine a permitted image quality level for using the coded image data, or determine a combination of a use of the coded image data and a permitted image quality level. This allows flexible setting of copyright levels.

Incidentally, any combinations of the foregoing components, and the components and expressions of the present invention mutually replaced with methods, apparatuses, systems, recording media, programs, and the like are also intended to constitute applicable aspects of the present invention.

DETAILED DESCRIPTION OF THE INVENTION

The present invention is predicated on a technology for generating still images or moving images of different image qualities from a single coded image data stream. For instance, a method for coding a moving image by Motion-JPEG 2000 scheme will be described briefly with reference to FIG. 1. A not-shown image coding apparatus generates a coded data stream of a moving image by coding individual frames of the moving image continuously frame by frame. At the beginning of the coding process, an original image OI 102 corresponding to a single frame of the moving image is read into a frame buffer. The original image OI read into the frame buffer is hierarchized by a wavelet transformer.

The JPEG-2000 wavelet transformer uses a Daubechies filter. This filter functions as a high-pass filter and a low-pass filter both in x and y directions of the image simultaneously, thereby dividing a single image into four frequency sub-bands. These sub-bands include an LL sub-band, an HL sub-band, an LH sub-band, and an HH sub-band. The LL sub-band contains low frequency components both in the x and y directions. The HL sub-band and the LH sub-band contain low frequency components in either one of the x and y directions and high frequency components in the other direction. The HH sub-band contains high frequency components both in the x and y directions. This filter also has the function of reducing the number of pixels by half both in the x and y directions. That is, each sub-band has as many pixels as ½ those of the unprocessed image both in the vertical and horizontal directions. A single time of filtering thus produces sub-band images having a resolution, i.e., image size of ¼. As employed in this specification, an image obtained by applying a single wavelet transform to the original image OI will be referred to as a first-level image $WI_1$. Hereinafter, an nth-level image will be referred to as $WI_n$ according to the number of wavelet transforms applied thereto.

Figure 1:
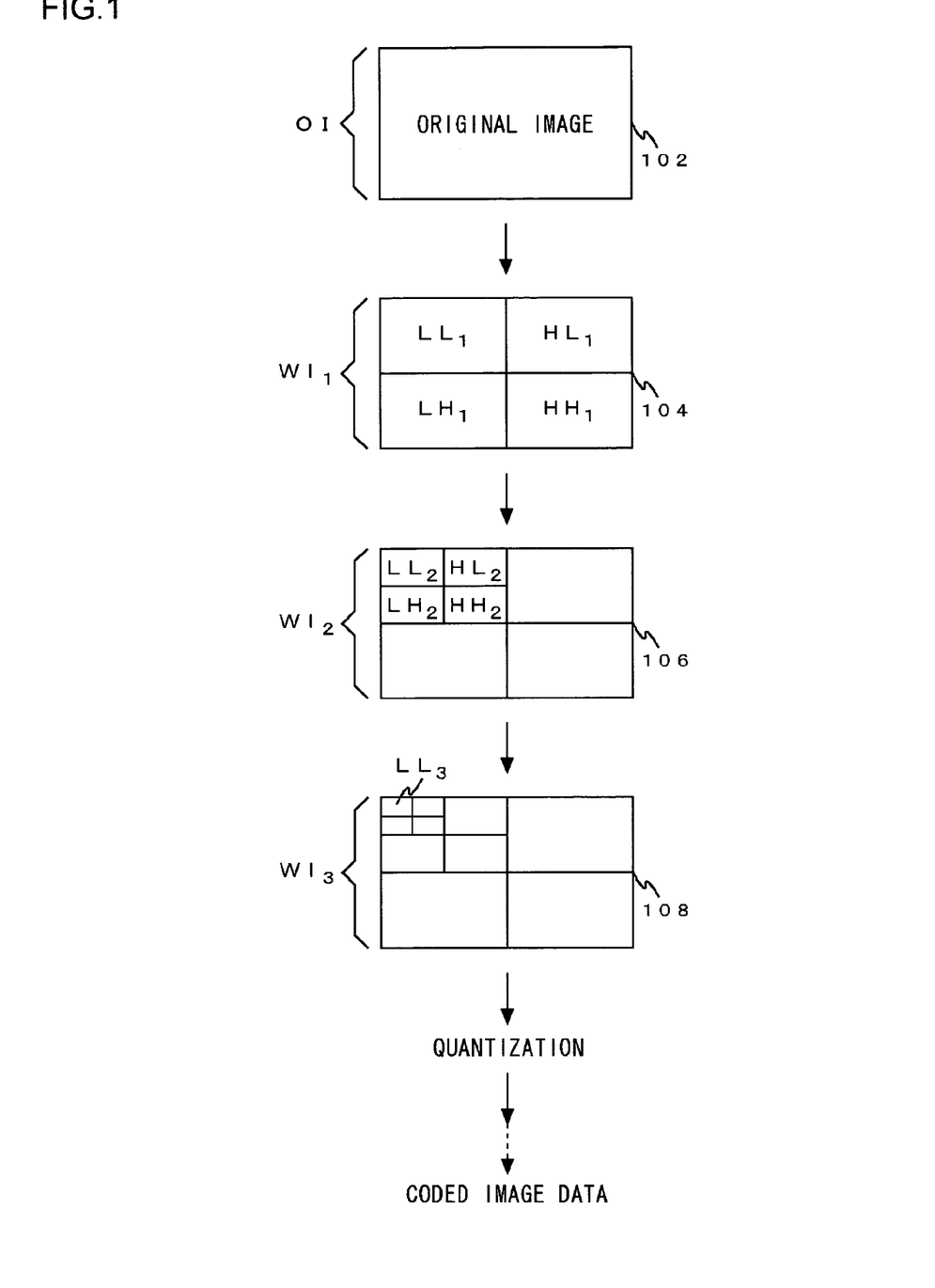
FIG. 1 is a diagram showing the procedure of image coding processing.

As schematically shown in FIG. 1, four sub-bands $LL_1$, $HL_1$, $LH_1$, and $HH_1$ are created in the first-level image $WI_1$ 104.

A wavelet transform is applied to the first-level image $WI_1$, 104 to generate a second-level image $WI_2$ 106. Here, the second and subsequent wavelet transforms are applied to only the LL sub-band components of the images in the respective previous levels. Consequently, the $LL_1$ sub-band of the first-level image $WI_1$ is decomposed into four sub-bands $LL_2$, $HL_2$, $LH_2$, and $HH_2$ of the second-level image $WI_2$ 106. The wavelet transformer performs this filtering a predetermined number of times, and outputs the wavelet transform coefficients of the individual sub-bands. The image coding apparatus subsequently performs quantization and other processing, and finally outputs coded image data CI.

For ease of explanation, the image coding apparatus in 10 this example shall apply three wavelet transforms to the original image OI. Suppose, for example, that the original image OI 102 has 1440×960 pixels. Then, the $LL_1$ sub-band of the first-level image $WI_1$ 104 has a size of 720×480, the $LL_2$ sub-band of the second-level image $WI_2$ 106 a size of 360×240, and the $LL_3$ sub-band of the third-level image $WI_3$ 108 a size of 180×120.

Concerning the hierarchical images, it should be noted that the low frequency components of the original image OI gather around the upper left in FIG. 1. In the case of FIG. 1, the $LL_3$ sub-band which falls on the upper left corner of the third-level image $WI_3$ is the lowest in frequency.

Conversely, the most basic properties of the original image OI can be reproduced as long as this $LL_3$ sub-band is available. This finding is utilized in the following embodiments.

Aside from Motion-JPEG 2000, the coded data stream may be of, e.g., SVC (Scalable Video Codec) which provides a single stream including both a high quality HD stream and a low quality SD stream in combination. Motion-JPEG is also applicable. Among JPEG schemes are ones in which frames are transmitted in ascending order of the terms of coefficients obtained by discrete cosine transform. Here, image quality can be selected depending on up to what orders of terms the coefficients are used. According to these standards, spatial resolution can be coded hierarchically.

The foregoing example has been dealt with the case where the hierarchical structure is achieved by the coding of spectral selection type. However, a hierarchical structure may be obtained by coding of successive approximation type. More specifically, the number of higher-order bits of DCT (Discrete Cosine Transform) coefficients or wavelet coefficients to be decoded can be adjusted to achieve decoding with different image qualities. Moreover, in MPEG-2, not only the foregoing spatial resolution but also time resolution can be coded hierarchically by adjusting the number of frames.

First Embodiment

A first embodiment is an image processing apparatus for generating a hierarchical coded image data stream, and a coded image data stream to which copyright levels corresponding to images of the respective hierarchy levels are added.

Figure 2:
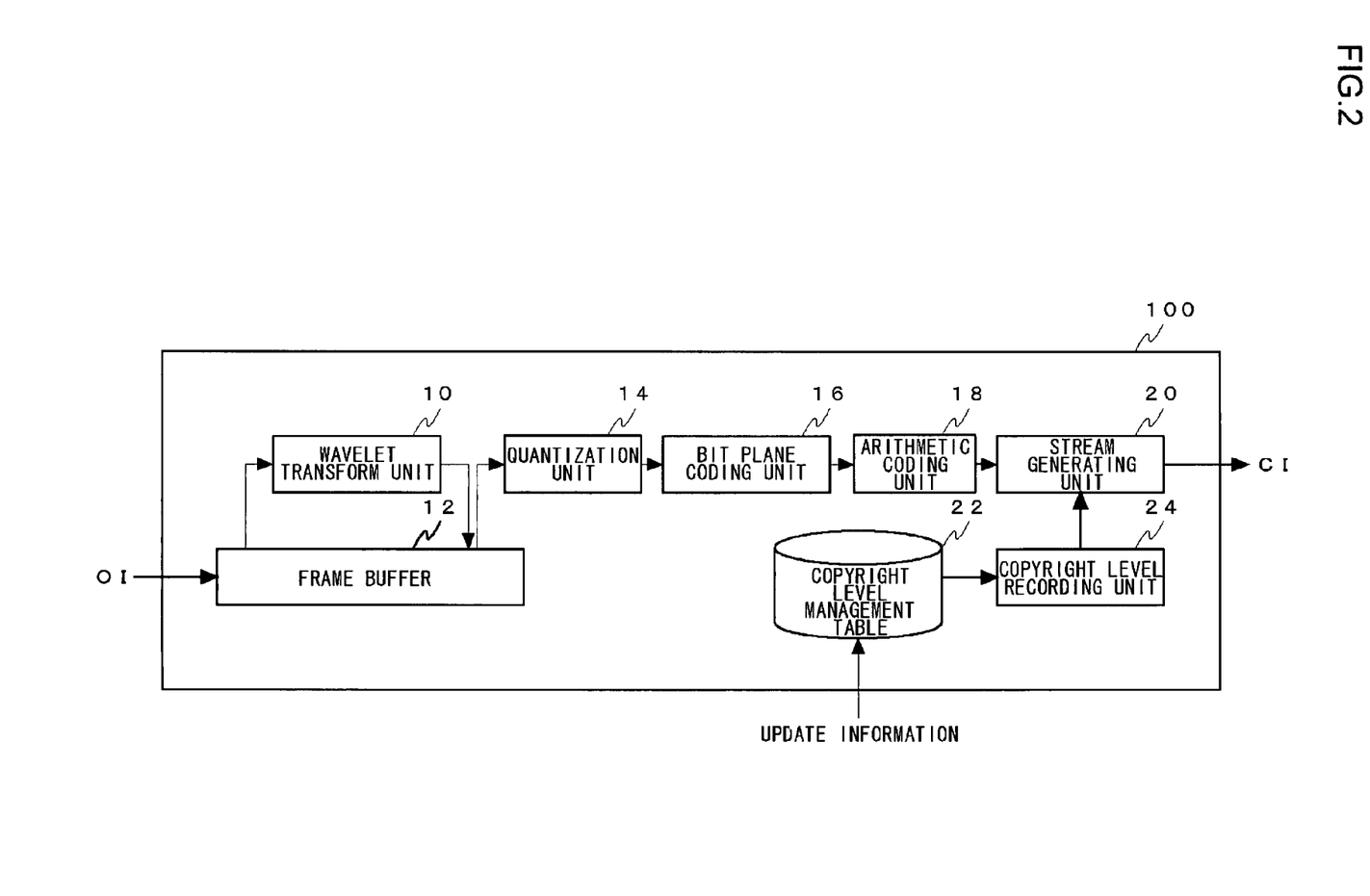
FIG. 2 is a diagram showing the configuration of an image processing apparatus according to a first embodiment.

FIG. 2 shows the configuration of an image processing apparatus 100 according-to the first embodiment. In terms of hardware, this configuration can be achieved by an arbitrary computer CPU, a memory, and other LSIs. In terms of software, it can be achieved by a program-which is loaded on a memory and has decoding facilities. The functional blocks shown here are achieved by the cooperation of these. It will thus be understood by those skilled in the art that these functional blocks may be achieved in various forms including hardware alone, software alone, and combinations thereof.

The image processing apparatus 100 includes a wavelet transform unit 10, a frame buffer 12, a quantization unit 14, a bit plane coding unit 16, an arithmetic coding unit 18, a stream generating unit 20, a copyright level management table 22, and a copyright level recording unit 24.

Initially, an original image OI is read into the frame buffer 12. The wavelet transform unit 10 reads the original image OI from the frame buffer 12, and converts the image by a wavelet transform recursively. As described above, a Daubechies filter is used for the JPEG-2000 wavelet transform. This filter functions as a high-pass filter and a low-pass filter both in vertical and horizontal directions of the image, thereby dividing the single image into four frequency sub-bands. Each of sub-bands has as many pixels as ½ those of the unprocessed image both in the vertical and horizontal directions. A single time of filtering thus creates sub-band images having a resolution, i.e., image size of ¼. The sub-band images obtained thus are once stored into the frame buffer 12.

The wavelet transform unit 10 reads the image of the LL sub-band, or the lowest-frequency component out of the sub-bands obtained thus, from the frame buffer 12. The wavelet transform unit 10 performs the filtering process again to divide the sub-band image into four, i.e., LL, HL, LH, and HH sub-bands further, and writes them to the frame buffer 12. The filtering is performed a predetermined number of times, and the LL sub-band occurring from the last filtering is acquired as an image the closest to a DC component in the original image OI. The amounts of high frequency components in the respective sub-bands in an identical hierarchy level, or four sub-bands obtained through the application of the filtering an identical number of times, increase in order of LL, HL, LH, and HH. Images containing high frequency components more than these sub-bands are the four sub-bands obtained in the previous filtering process. Since such vertical and horizontal four-way filtering is applied to the lowest-frequency components repeatedly, an image having a vertical and horizontal four-way recursive structure which contains low to high frequency components in a hierarchical configuration is obtained in the frame buffer 12.

The quantization unit 14 quantizes the hierarchical image stored in the frame buffer 12 from lower to higher frequency components in succession as needed. The bit plane coding unit 16 renders wavelet coefficients, which are quantized and divided into code blocks for arithmetic coding, into a bit plane. The arithmetic coding unit 18 arithmetically codes this bit plane. The stream generating unit 20 generates a bit stream from the arithmetically-coded bit string. Through these processes, the foregoing original image OI is turned into coded image data CI.

Figure 3:
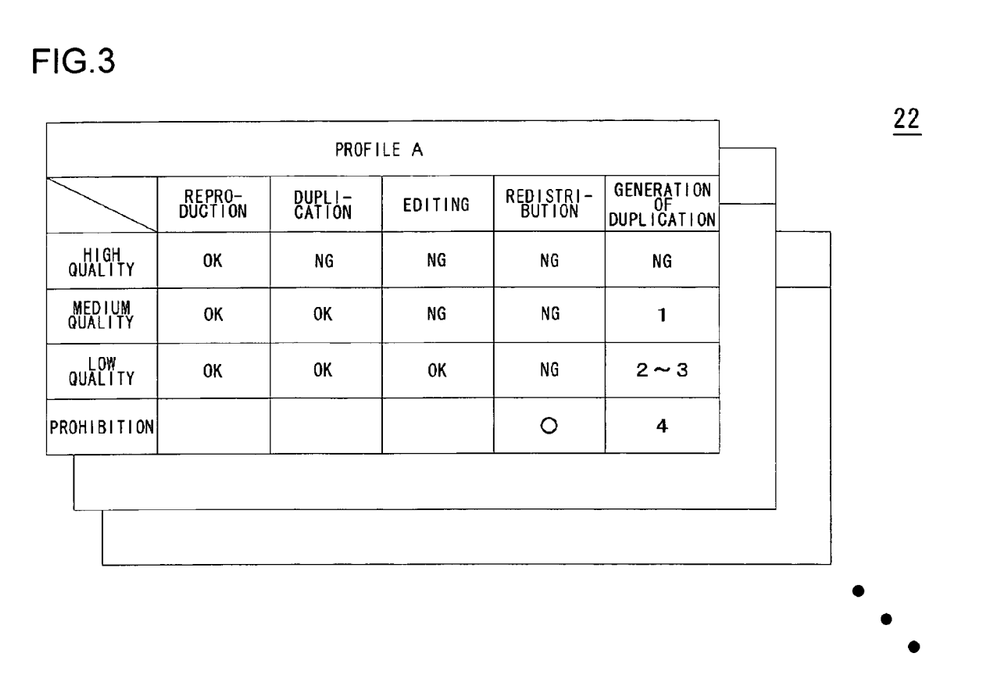
FIG. 3 is a diagram showing an example of a copyright level management table.

The copyright level management table 22 manages copyright levels to be permitted to users who use the coded image data CI. FIG. 3 shows an example of the copyright level management table 22. The uses of the coded image data CI are shown on the horizontal axis, and the permitted image quality levels corresponding to the respective uses on the vertical axis. In FIG. 3, reproduction is allowed in all the low, medium, and high image quality levels. Duplication is prohibited in the high image quality level, and permitted in the low and medium image quality levels. Editing is prohibited in the medium and high image quality levels, and permitted in the low image quality level. The editing here includes such cases as removing commercial breaks from coded image data which is received in a digital television broadcast. It follows that the medium image quality is available for data duplication, but not for the removal of commercial brakes. Redistribution is prohibited. None of the image quality levels is available for redistribution.

The generation of duplication shows generations capable of duplication and the permitted-image quality levels of the generations. The first generation can be duplicated in medium image quality. The duplication of the second generation, or the duplication of the first-generation duplication data, can only be available in low image quality. The fourth and subsequent generations cannot be duplicated. The copyright level management table 22 manages profiles such as described above user by user. The individual items of the profiles can be updated through key inputs and the like by the administrator when needed.

When the coded image data CI is provided to users for pay, the available uses and the permitted image quality levels for those uses vary depending on the fees paid by the users and the set packages. The profiles may also be created region by region or time by time, not user by user. For example, time-based profiles can be created to impose time limits on the contents availability for users. When user devices are configured to switch profiles after some point in time, it is possible to establish such time limit settings as lower the permitted image quality levels or restrict some uses, instead of making all the contents unavailable after that period.

The copyright level recording unit 24 records copyright level information on the corresponding profile into a header or other areas of the coded image data CI in consideration of such factors as users and regions to be provided. The copyright level information may be written to the header and other areas possible for the administrator to set freely. To impose time limits or the like, the copyright level information on a plurality of profiles may be added. Incidentally, the copyright level management table 22 and the copyright level recording unit 24 may be configured as an external independent device. This device can be network-connected to add copyright level information to the coded image data CI that is being communicated over the network.

Figure 4:
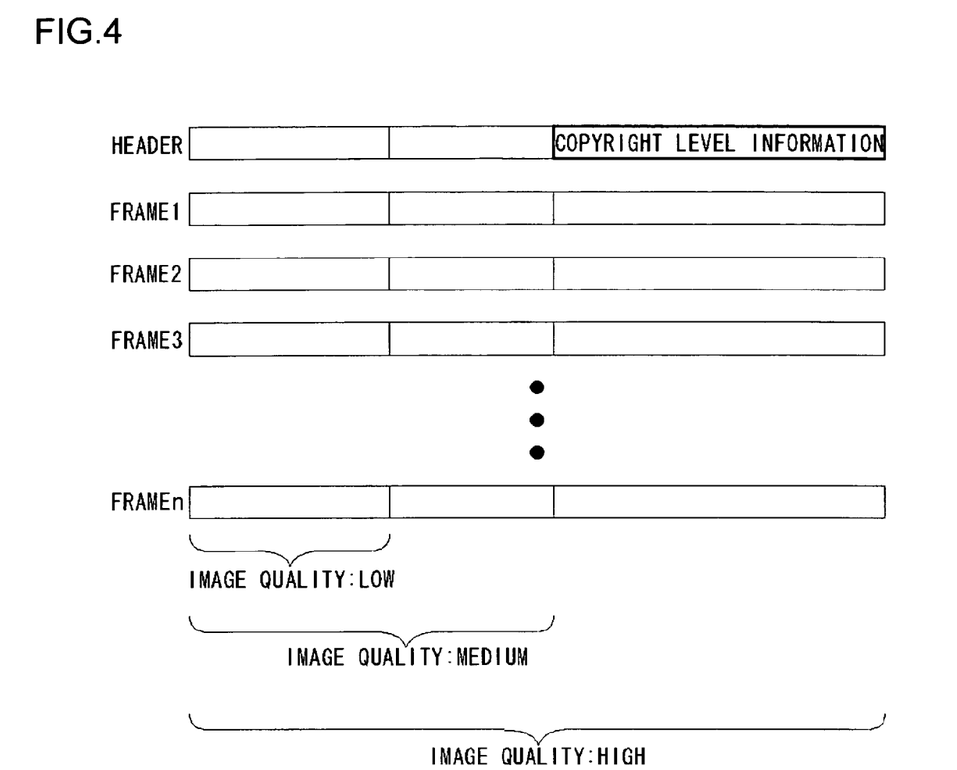
FIG. 4 is a diagram showing the data structure of coded image data.

FIG. 4 shows the data structure of the coded image data CI. The header in FIG. 4 represents an image header. The foregoing copyright level information can be added to a free space in this header area. Although not shown in the diagram, each frame also has a frame header which describes information and the like necessary-for decoding. When the hierarchical coded image data CI is generated through frequency division as described above, the data area of each frame describes data on the direct current components, low frequency components, medium frequency components, and high frequency components in succession from the top. Thus, images can even be reproduced from the first halves of the frames alone, whereas the images are low in quality. Images improve in quality as the reproduction covers the last halves.

As above, according to the present embodiment, the available uses of the contents and the permitted image quality levels corresponding to those uses can be set flexibly by the contents provider. This allows flexible copyright management. For example, the contents may be made free to use up to a certain level of image quality, in view of the effect of reducing unauthorized use substantially.

Second Embodiment

A second embodiment is an image processing apparatus which receives a hierarchical coded image data stream and performs processing in accordance with the copyright levels.

Figure 5:
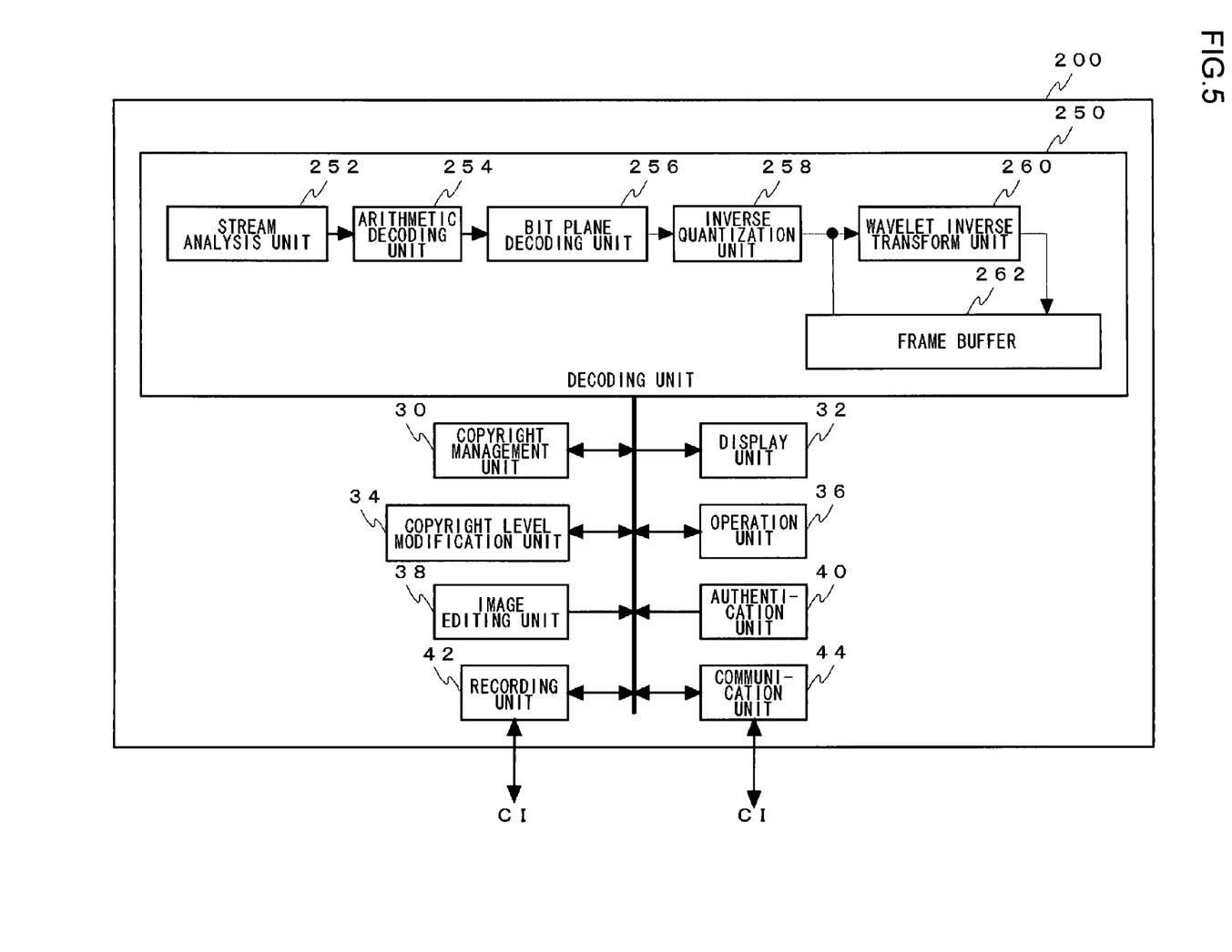
FIG. 5 is a diagram showing the configuration of the image processing apparatus according to a second embodiment.

FIG. 5 shows the configuration of an image processing apparatus 200 according to the second embodiment. The image processing apparatus 200 is provided with a decoding unit 250. The decoding unit 250 comprises a stream analysis unit 252, an arithmetic decoding unit 254, a bit plane decoding unit 256, an inverse quantization unit 258, a wavelet inverse transform unit 260, and a frame buffer 262.

The stream analysis unit 252 receives coded image data CI from a recording unit 42 or a communication unit 44 of this apparatus, and analyzes the data stream. The stream analysis unit 252 also detects copyright level information included in the header or the like of the coded image data CI, and passes it to a copyright management unit 30. The arithmetic decoding unit 254 applies arithmetic decoding to a data string to be decoded which is found as the result of the analysis. The bit plane decoding unit 256 decodes the data resulting from the arithmetic decoding into the form of a bit plane with respect to each color component. The inverse quantization unit 258 inversely quantizes the quantized data decoded. The wavelet inverse transform unit 260 applies wavelet inverse transforms to the nth-level image $WI_n$ resulting from the inverse quantization, by using the frame buffer 262. Each time the wavelet inverse transform is applied to the coded image data CI, an image of the higher level is obtained. Decoding up to the topmost hierarchical level provides decoded image data DI.

The copyright management unit 30 manages the copyrights of the coded image data CI for use in this apparatus. What are managed include copyright level information detected by the stream analysis unit 252, and copyright level information acquired through sessions with servers and the like of the contents provider via the communication unit 44. When a user uses the coded image data CI, the copyright management unit 30 identifies the permitted image quality level corresponding to the use, and instructs the wavelet inverse transform unit 260 of the number of times to apply the wavelet inverse transform according to the image quality level.

A display unit 32 displays the decoded image data DI in the image quality level decoded by the decoding unit 250. This image quality level is in accordance with the foregoing copyright level information. A copyright level modification unit 34 modifies the copyright level information added to the header or the like of the coded image data CI, under instructions from the copyright management unit 30. For example, modifications are made in such cases that redistribution is conducted, the coded image data CI is duplicated in the recording unit 42, and the foregoing copyright level must be changed due to a time limit.

An operation unit 36 is a user interface, from which various user instructions are given to this apparatus. An image editing unit 38 conducts such edits as removing some part of the coded image data CI and applying a variety of effects to the coded image data CI itself. These edits are also in conformity to the foregoing copyright level information. The copyright management unit 30 specifies the permitted image quality level(s) editable.

An authentication unit 40 makes various operations such as accepting an authentication card for modifying the foregoing copyright level information managed by the copyright management unit 30, and conducting biometrics authentication by using physical characteristics of users. The authentication card is provided from the contents provider to a user if the contents provider and the user have previously signed a contract etc. For example, this allows such processing that all the uses of the contents are prohibited by the copyright level information that is added to the header or the like, and then the foregoing authentication or the like is conducted to permit a specified use up to a certain image quality level.

The recording unit 42 is a high-capacity recording unit such as a hard disk and a DVD drive. The coded image data CI may be input through DVD media and the like. DVD media and the like may also be used for duplication. These operations are also made in conformity to the copyright levels as described above. The communication unit 44 may be such devices as a communication interface for a wireless or wired network and a receiver unit for receiving broadcast waves. These devices can be used to exchange the coded image data CI with exterior. The redistribution mentioned above is also carried out through the communication unit 44.

Figure 6:
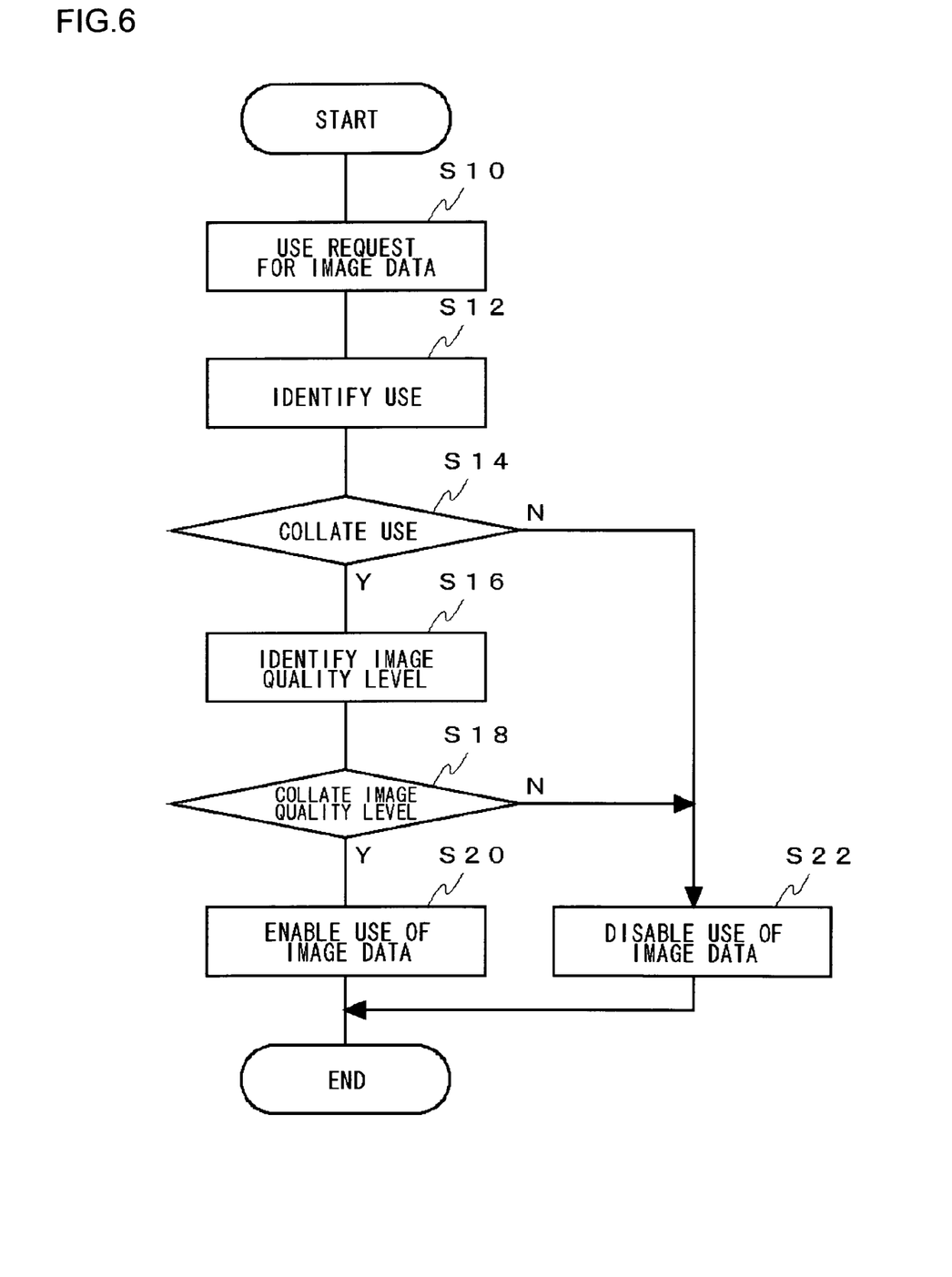
FIG. 6 is a flowchart showing the operation of the image processing apparatus according to the second embodiment.

FIG. 6 is a flowchart showing the operation of the image processing apparatus according to the second embodiment. Initially, a use request for the coded image data CI is input from the operation unit 36 to the copyright management unit 30 (S10). Here, the intended use of this coded image data CI and a desired image quality level are specified by the user. The copyright management unit 30 identifies the intended use and use information included in the copyright level information corresponding to the user (S12), and performs collating (S14). If the intended use is prohibited (N at S14), the use of the image data is disabled (S22).

If the intended use is not prohibited (Y at S14), the copyright management unit 30 identifies the image quality level desired by the user and the permitted image quality level(s) corresponding to the use, included in the copyright level information (S16). The copyright management unit 30 then performs collating (S18). If the use at the desired image quality level is prohibited (N at S18), the use of the image data is disabled (S22). If the use at the desired image quality level is permitted (Y at S18), the use of the image data at the desired image quality level is enabled (S20).

Incidentally, the image processing apparatus 200 of the present embodiment may have any combination of components as long as it contains the decoding unit 250 and at least either one of the recording unit 42 and the communication unit 44. For example, the display unit 32 alone may be added to the configuration just mentioned. The display unit 32 may even be omitted to constitute an apparatus for duplication or image editing.

As above, according to the present embodiment, users who receive the coded image data are permitted to use the data under some limitations on the uses and the image quality levels, if any, instead of being permitted or prohibited in an either-or fashion. Consequently, demands for copyright protection from contents providers and use requests for contents from users can be balanced flexibly.

Up to this point, the present invention has been described in conjunction with the embodiments thereof. These embodiments are given solely by way of illustration. It will be understood by those skilled in the art that various modifications may be made to combinations of the foregoing components and processes, and all such modifications are also intended to fall within the scope of the present invention.

The second embodiment has dealt with a hierarchical structure of spectral selection type. However, a hierarchical structure of successive approximation type may be used. In this case, images of various image quality levels can be decoded by discarding a predetermined number of lower order bits out of the bit string of the wavelet transform coefficients. That is, the copyright management unit 30 can adjust the image quality level by specifying the number of bits to be converted to the bit plane decoding unit 256.

When this hierarchical method is used, it is possible to establish different image quality levels in units of sections of an image. In this case, the individual profiles on the table for managing the copyright level information shown in FIG. 3 may be described with three parameters, i.e., use, image quality level, and image section, not the two parameters of use and image quality level alone. Description with the two parameters of image quality level and image section may also be applicable. In this case, the contents provider can exercise more flexible copyright management than in the foregoing embodiments.

Different image quality levels can be achieved not only through hierarchical resolutions, but also by hierarchizing the compression rate or the number of colors. The compression rate may be hierarchized by using the layering function of JPEG 2000. Color images are rendered in luminance components and color-difference components. The color-difference components may be subjected to the hierarchical techniques as described above.

While the foregoing embodiments have dealt with the cases where the spatial filtering for coding an image is achieved by wavelet transforms, it is possible to use other spatial frequency conversions. For example, a discrete cosine transform, the standard used in JPEG, may be used.

Although the present invention has been described by way of exemplary embodiments, it should be understood again that many other changes and substitutions may still further be made by those skilled in the art without departing from the scope of the present invention which is defined by the appended claims.

What is claimed is:

1. An image processing apparatus which generates coded image data multiplexed in such manner that can be decoded into the images each having different image quality, comprising:

an adding unit which adds to the coded image data in advance a copyright level designating permission or prohibition for each of combinations formed by use of the coded image data and image qualities of the coded image data, the use of the coded image data including reproduction, duplication, editing and redistribution of the image data, wherein as a result of adding the copyright level, a decoding unit is allowed to refer to each of the combinations of image qualities of the coded imaged data and the use of the coded image data, to determine as to whether the use is permitted, and to prohibit the use if the use is not permitted, and the copyright level is defined by a table having at least two parameters including a first parameter indicating the use of the coded image data and a second parameter indicating the image qualities of the coded image data, the table including designations of permission or prohibition for each of the combination of the first parameter and the second parameter, which represent permission or prohibition of the use of the coded image data with respect to the image qualities of the coded image data.

2. An image processing apparatus which processes coded image data multiplexed in such manner that can be decoded into the images each having different image quality, comprising:

a management unit which manages a copyright level,
wherein the copyright level is defined by a table having at least two parameters including a first parameter indicating use of the coded image data and a second parameter indicating image qualities of the coded image data, the table including designations of permission or prohibition for each of the combination of the first parameter and the second parameter, which represent permission or prohibition of the use of the coded image data with respect to the image qualities of the coded image data, the use of the coded image data including reproduction, duplication, editing and redistribution of the image data; and a processing unit which performs processing in accordance with the copyright level, wherein
the management unit refers to the table, determines whether the use of the coded image data is permitted with respect to the image qualities of the coded image data, and configures the processing unit to prohibit the use if the use is not permitted.

3. The image processing apparatus according to claim 1, wherein
the adding unit adds the copyright level—during the coding process for generating the coded image data.

4. The image processing apparatus according to claim 1, wherein
the adding unit adds the copyright level after the coding process for generating the coded image data.

5. The image processing apparatus according to claim 1, wherein the copyright level designates permission or prohibition for each of combinations formed by the use of the coded image data, a plurality of image qualities, and a plurality of image sections to be processed, and
as a result of adding the copyright level, a decoding unit is allowed to refer to each of the combinations of image qualities of the coded image data, the use of the coded image data, and image sections, to determine as to whether the use is permitted, and to prohibit the use if the use is not permitted.

6. The image processing apparatus according to claim 2, wherein the copyright level designates permission or prohibition for each of combinations formed by use of the coded image data, a plurality of image qualities, and a plurality of image sections to be processed, and
the management unit refers to each of the combinations of image qualities of the coded image data, use of the coded image data, and image sections, determines whether the use is permitted with respect to the image qualities of the coded image data, and configures the processing unit to prohibit the use if the use is not permitted.

7. An image processing method for generating coded image data multiplexed in such manner that can be decoded into the images each having different image quality, comprising:

adding, by an image processing apparatus, to the coded image data a copyright level wherein the copyright level is defined by a table having at least two parameters including a first parameter indicating use of the coded image data and a second parameter indicating image qualities of the coded image data, the table including designations of permission or prohibition for each of the combination of the first parameter and the second parameter, which represent permission or prohibition of the use of the coded image data with respect to the image qualities of the coded image data, the use of the coded image data including reproduction, duplication, editing and redistribution of the image data , wherein as a result of adding the copyright level, a decoding unit is allowed to refer to the table, to determine as to whether the use of the coded image data is permitted with respect to the image qualities of the coded image data, and to prohibit the use if the use is not permitted.

8. An image processing method for processing coded image data multiplexed in such manner that can be decoded into the images each having different image quality, comprising:

reading, by an image processing apparatus, a copyright level wherein the copyright level is defined by a table having at least two parameters including a first parameter indicating use of the coded image data and a second parameter indicating image qualities of the coded image data, the table including designations of permission or prohibition for each of the combination of the first parameter and the second parameter, which represent permission or prohibition of the use of the coded image data with respect to the image qualities of the coded image data, the use of the coded image data including reproduction, duplication, editing and redistribution of the image data, and managing the copyright level; and performing, by the image processing apparatus, processing in accordance with the copyright level, wherein said reading and managing refers to the table, determines whether the use of the coded image data is permitted with respect to the image qualities of the image data, and prohibits the use if the use is not permitted.

9. The image processing apparatus according to claim 1, wherein the content of the copyright level changes with elapse of time.

* * * * *